(12) United States Patent
Hwang et al.

(10) Patent No.: US 8,829,755 B2
(45) Date of Patent: Sep. 9, 2014

(54) COMPOSITE PERMANENT MAGNET SYNCHRONOUS MACHINE

(75) Inventors: Jonq-Chin Hwang, Taipei (TW); Chun-Yu Hsiao, Longtan Township, Taoyuan County (TW); Sheng-Nian Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 105 days.

(21) Appl. No.: 13/452,465

(22) Filed: Apr. 20, 2012

(65) Prior Publication Data
US 2013/0069496 A1    Mar. 21, 2013

(30) Foreign Application Priority Data
Sep. 19, 2011  (TW) .............................. 100133617 A (51) Int. Cl.
*H02K 3/00* (2006.01)
*H02K 1/00* (2006.01)
*H02K 21/16* (2006.01)

(52) U.S. Cl.
CPC ............ *H02K 21/16* (2013.01); *H02K 2213/03* (2013.01)
USPC .......................... 310/184; 310/198; 310/68 R (58) Field of Classification Search
USPC .......... 310/216.001–216.137, 156.01–156.84
See application file for complete search history.

(56) References Cited

U.S. PATENT DOCUMENTS

| | | | |
|---|---|---|---|
| 5,051,639 A * | 9/1991 | Satake et al. .................. | 310/112 |
| 6,093,984 A * | 7/2000 | Shiga et al. ..................... | 310/26 |
| 2005/0017591 A1* | 1/2005 | Brewster et al. .............. | 310/179 |
| 2007/0247012 A1* | 10/2007 | Shin et al. ................. | 310/156.06 |
| 2009/0108700 A1* | 4/2009 | Sakuma et al. ............... | 310/254 |

\* cited by examiner

*Primary Examiner* — Tran Nguyen
*Assistant Examiner* — Leda Pham
(74) *Attorney, Agent, or Firm* — Muncy, Geissler, Olds & Lowe, P.C.

(57) ABSTRACT

A composite permanent magnet synchronous machine includes a permanent magnet synchronous machine module having a rotor unit and a stator unit; a bottom base having an accommodation space; a top cover having a front surface; and a shaft penetrating through the front surface. The rotor unit has P rotor magnets and the stator unit has S slots, wherein a tooth part is defined between every two adjacent slots, and a coil is wound on the tooth part, where P is 38N, S is 36N, and N is a positive integer; or P is 34M, S is 36M, and M is a positive integer. The machine is suitable for wind power generators or any other machine structure.

12 Claims, 7 Drawing Sheets

COMPOSITE PERMANENT MAGNET SYNCHRONOUS MACHINE

CROSS REFERENCE TO RELATED APPLICATION

This application claims the benefits of the Taiwan Patent Application Serial Number 100133617, filed on Sep. 19, 2011, the subject matter of which is incorporated herein by reference.

BACKGROUND OF THE INVENTION

1. Field of the Invention

The present invention relates to a composite permanent magnet synchronous machine and, more particularly, to a composite permanent magnet synchronous machine capable of switching to a different phase, such as three-phase, six-phase, and nine-phase, thus being allowed to connect in parallel with utility power with different voltages of 110/220/440 V.

2. Description of Related Art

Electrical energy has become essential power for human beings. Currently, thermal power generation is still the most popular way for generating power in the world, and the amount of power generated is also the largest. Typically, thermal power generation is employed to burn fossil fuel, such as coal, petroleum, or natural gas; to heat up water and generate vapor for driving a power generator. However, thermal power generation may place a great burden on the environment, such as increased carbon dioxide emissions or the high probability of acid rain.

In addition to thermal power generation, nuclear power generation is also a popular way to generate power in the world. Nuclear power generation is employed to produce energy by a controllable nuclear reaction, so as to generate power, heat content, and electrical energy. However, a severe shortcoming of nuclear power generation is the need of processing nuclear waste. Nuclear waste has to be isolated from the outside environment due to the radioactivity contained therein. Although the radioactivity will decrease gradually, nuclear waste generated by nuclear power generation has to be stored for a long time, even up to thousands of years.

Due to the fast growth of power consumption by the human beings, energy consumption in the world is estimated to grow at a rate of 2% per year from 2003 to 2030. As a comparison, wind power generation systems are also developing rapidly in the world, and the development can be seen with the evidence that wind power generation grew at a rate of 24% per year on average from 4.8 GW in 1995 to 58 GW in 2005. Therefore, to increase the efficiency of wind power generation systems and to decrease the weight and volume thereof has become the major goal for future development in related fields.

A wind power generator is operated by airflow for providing available energy. When the airflow speed rises, kinetic energy increases. The kinetic energy of wind is employed to cause the rotation of a windmill, so as to drive a power generator for generating electrical energy. As compared with thermal and nuclear power generation, wind power generation causes relative low pollution to the environment and needs not to deal with waste material. Moreover, wind power is a natural energy source, and thus electricity generation by wind power will not be influenced by any shortage of fossil fuel.

In a wind power generation system, the current harmonic at the generator side is very high, which may cause undesired effects on the generator. For example, the mechanical efficiency is decreased, and the harmonic frequency is likely to cause core loss and copper loss, resulting in over heating, noise production, and mechanical vibration or similar problems on generators. Therefore, how to reduce the current harmonic at the generator side and increase the efficiency are major issues to be improved in wind power generation systems or even all other power generation systems.

Traditionally, most electric machines are of a three-phase machine structure, such as a three-phase power generator or three-phase electric motor. However, the prior three-phase machine structure is unable to satisfy the actual requirement due to the development of technology and the increased electricity consumption rate. Therefore, six-phase machine structure has been introduced. Moreover, machine structure capable of switching between three-phase and six-phase is also derived through some research, which can increase the utilization of conductors, and further increase reliability and safety when the machine structure is under operation.

However, the machine structure capable of switching between three-phase and six-phase cannot meet the requirements for industries, which desire an innovative machine structure. Accordingly, it is desired to provide an improved composite machine structure capable of switching to three-phase, six-phase, or nine-phase, wherein the machine structure with nine-phase is a novel machine structure. Since the fabrication of a single nine-phase machine structure is rather difficult due to the particular slot/pole combination and the match of electrical degree, it is surely innovative to construct a machine structure capable of switching to three-phase, six-phase, and nine-phase.

After overcoming the aforementioned problems and difficulties encountered in the prior machine structures, the present invention thus provides a composite permanent magnet synchronous machine capable of switching to three-phase, six-phase, and nine-phase, which is suitable for use not only in a wind power generator, but also in any other machine structures.

SUMMARY OF THE INVENTION

It is an object of the present invention to provide a permanent magnet synchronous machine module capable of switching to different phases including three-phase, six-phase, and nine-phase.

It is another object of the present invention to provide a composite permanent magnet synchronous machine capable of switching to different phases including three-phase, six-phase, and nine-phase.

It is a further object of the present invention to provide a composite permanent magnet synchronous machine capable of being connected in parallel with utility power with different voltages of 110/220/440 V, and also capable of reducing the ripple factor of a power generator, so as to reduce the noise when the power generator is under operation and to increase the output efficiency.

To achieve the object, the permanent magnet synchronous machine module of the present invention comprises: a rotor unit with a plurality of rotor magnets; and a stator unit with a plurality of slots surrounding the rotor unit, wherein the number of the rotor magnets for said rotor unit is P and the number of the slots for said stator unit is S; a tooth part is provided between every two adjacent slots and a coil is wound on the tooth part, wherein P and S are 38N and 36N, respectively, and N is a positive integer; or P and S are 34M and 36M, respectively, and M is a positive integer.

To achieve the object, the composite permanent magnet synchronous machine of the present invention comprises: a permanent magnet synchronous machine module having a rotor unit with a plurality of rotor magnets and a stator unit with a plurality of slots surrounding the rotor unit; a bottom base having an accommodation space; a top cover having a front surface assembled with the bottom base so as to accommodate the permanent magnet synchronous machine module in between the bottom base and the top cover; and a shaft penetrating through the front surface and connected with the rotor unit, wherein the number of the rotor magnets for the rotor unit is P and the number of the slots for the stator unit is S; a tooth part is provided between every two adjacent slots and a coil is wound on the tooth part, wherein P and S are 38N and 36N, respectively, and N is a positive integer; or P and S are 34M and 36M, respectively, and M is a positive integer.

The composite permanent magnet synchronous machine is suitable for use in not only a wind power generator, but also any kind of machine structures. In the meantime, the machine structure provides more flexibility in use due to the property thereof, which is able to switch to three-phase, six-phase, or nine-phase based on the actual requirement. Furthermore, since the machine structure of the present invention can also be used for constructing machine structures with three-phase, six-phase, or nine-phase, capabilities, the same mold can be used for fabricating them, so as to possess a wide application range, and further to decrease the manufacturing cost.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The permanent magnet synchronous machine module of the present invention includes: a rotor unit, and a stator unit for surrounding the rotor unit, wherein the rotor unit has P rotor magnets and the stator unit has S slots, and a tooth part is provided between every two adjacent slots and a coil is wound on the tooth part, where P is 38N, S is 36N and N is a positive integer; or P is 34M, S is 36M, and M is a positive integer. In the following description, a machine structure with a slot/pole combination of 38 poles and 36 slots and a machine structure with a slot/pole combination of 34 poles and 36 slots are described as examples for delineating wiring connections of the present invention. It is to be understood that those skilled in the art can readily recognize other wiring connections for machine structures with different slot/pole combinations (i.e., multiple times of the poles and slots), and thus a detailed description therefore is deemed unnecessary.

Embodiment 1

38 Poles 36 Slots Permanent Magnet Synchronous Machine Module

Figure 1:
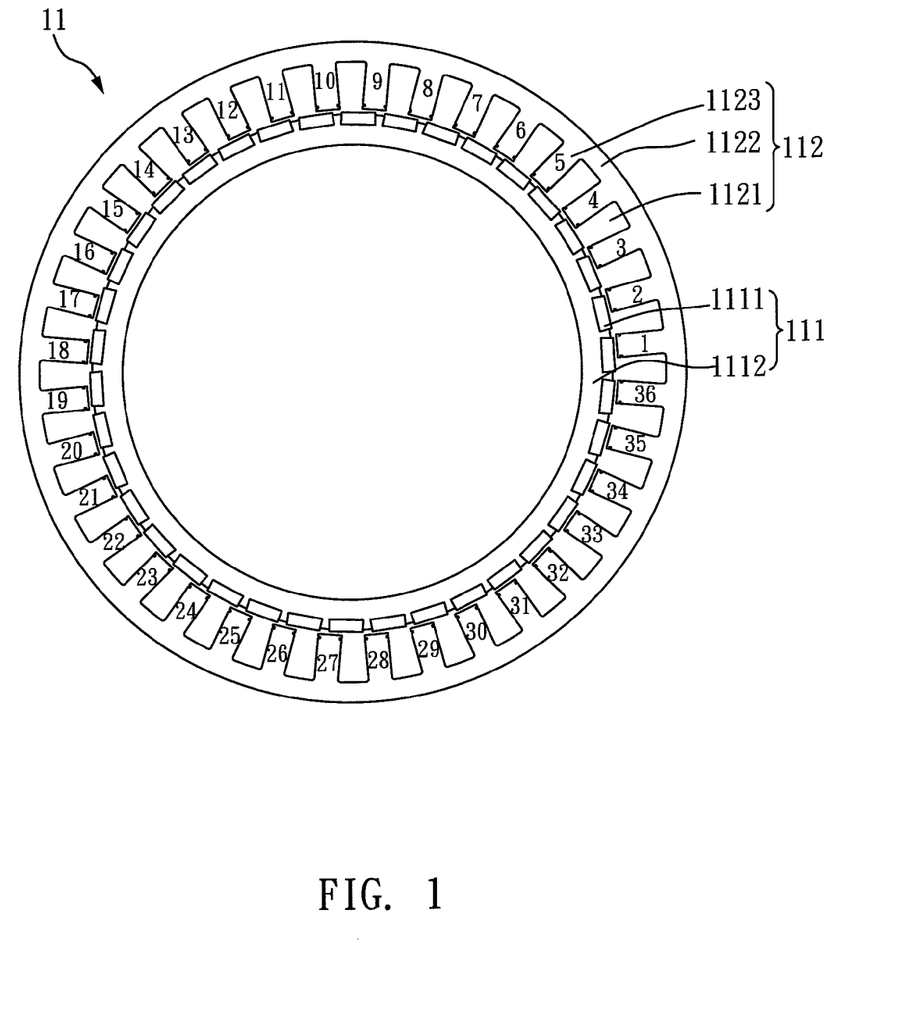
FIG. 1 is a schematic view illustrating the permanent magnet synchronous machine module with a slot/pole combination of 38 poles and 36 slots in accordance with the first embodiment of the present invention.

With reference to FIG. 1, FIG. 1 is a schematic view illustrating the permanent magnet synchronous machine module with a slot/pole combination of 38 poles and 36 slots in accordance with the first embodiment of the present invention. As illustrated in FIG. 1, in the permanent magnet synchronous machine module (11) with 38 poles and 36 slots, there are 38 rotor magnets (1111) disposed on the rotor unit (111) of the module (11). The 38 rotor magnets (1111) are made of permanent magnets, and the material thereof can be NdFeB or ferrite.

It should be noted that the material of these permanent magnets may include, but is not limited to, NdFeB, ferrite, SmCo, AlNiCo, or the like. The aforementioned 38 rotor magnets (1111) are preferably made of NdFeB. Moreover, the rotor unit (111) has a rotor steel sheet (1112) located at the inner side of the 38 rotor magnets (1111) for increasing the operation efficiency of the permanent magnet synchronous machine module (11).

On the other hand, as shown in FIG. 1, there are 36 slots (1121) disposed on the permanent magnet synchronous machine module (11), and a tooth part (1123) is provided between every two adjacent slots (1121); i.e., the stator unit (112) has 36 tooth parts (1123). Additionally, the stator unit (112) has a stator steel sheet (1122) disposed at the outer side of these 36 slots (1121). Besides, each tooth part (1123) has a coil wound thereon. The arrangement of 38 poles and 36 slots employed in the permanent magnet synchronous machine module of the present invention allows the 36 coils wound on the tooth parts (1123) to be connected with each other in a multi-phase stator winding connection, thereby enabling the permanent magnet synchronous machine module with 38 poles and 36 slots in accordance with the first embodiment of the present invention to be able to switch to three-phase, six-phase, or nine-phase, so as to connect in parallel to utility power with different voltage of 110/220/440V. It should be further noted that the aforementioned rotor steel sheet (1112) and the stator steel sheet (1122) are provided only for increasing the efficiency of the permanent magnet synchronous machine module with 38 poles and 36 slots in accordance with the first embodiment of the present invention, but are not essential elements for completing the purpose of switching to three-phase, six-phase, or nine-phase.

The detail description for the aforementioned multi-phase stator winding connection is given as follows. At first, with reference to FIG. 1 again, the numerals 1-36 are the serial numbers of the 36 tooth parts (1123) of the stator unit 112. The rule to number the tooth part includes: arbitrarily choosing a tooth part as a base tooth part and assigning a number of 1 to this base tooth part; and assigning numbers of 2-36 to the remaining 35 tooth parts in a counterclockwise order. As a result, each tooth part is assigned with a number in order. However, in addition to being counterclockwise, the order can be clockwise.

Figure 2:
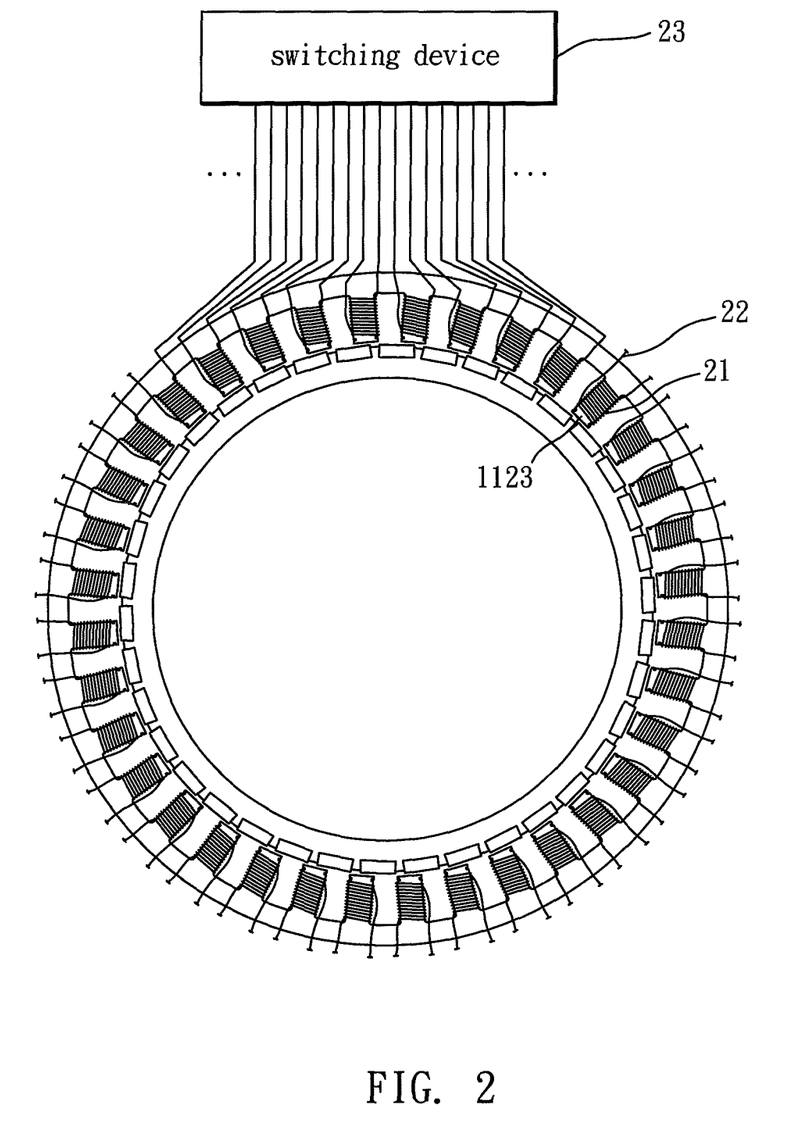
FIG. 2 is a schematic view illustrating the use of the permanent magnet synchronous machine module with 38 poles and 36 slots in accordance with the first embodiment of the present invention.

Then, with reference to FIG. 2, FIG. 2 is a schematic view illustrating the use of the permanent magnet synchronous machine module with 38 poles 36 slots in accordance with the first embodiment of the present invention. As shown in FIG. 2, each tooth part (1123) has a coil (21) wound thereon. It should be noted that the coil (21) is preferably wound on an insulation unit (not shown in the figure) first, and then the insulation unit is sleeved onto the tooth part (1123). However, this technical feature is well known to those skilled in the art and thus the relevant description is omitted for convenience.

Next, two connection ends (22) are dragged out from each coil wound on the tooth part (1123). As illustrated in FIG. 2, there are 36 tooth parts in the permanent magnet synchronous machine module with 38 poles and 36 slots, and thus there are 36 coils wound. Furthermore, there are 72 connection ends in total since each coil has two connection ends, and these 72 connection ends are all connected to a switching device (23).

The switching device (23) is provided to switch the permanent magnet synchronous machine module with 38 poles and 36 slots of the present invention to three-phase, six-phase, or nine-phase. When the permanent magnet synchronous machine module with 38 poles and 36 slots of the present invention is switched to three-phase by the switching device (23), the switching device (23) arranges the 72 connection ends in a three-phase connection so as to achieve the efficiency of three-phase.

Figure 3A:
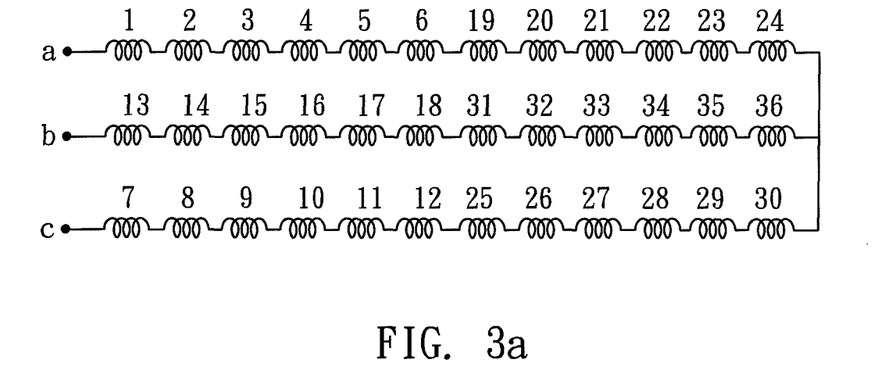
FIG. 3a is a schematic view illustrating the serial-type three-phase stator winding connection adopted by the permanent magnet synchronous machine module with 38 poles and 36 slots in accordance with the first embodiment of the present invention.
Figure 3B:
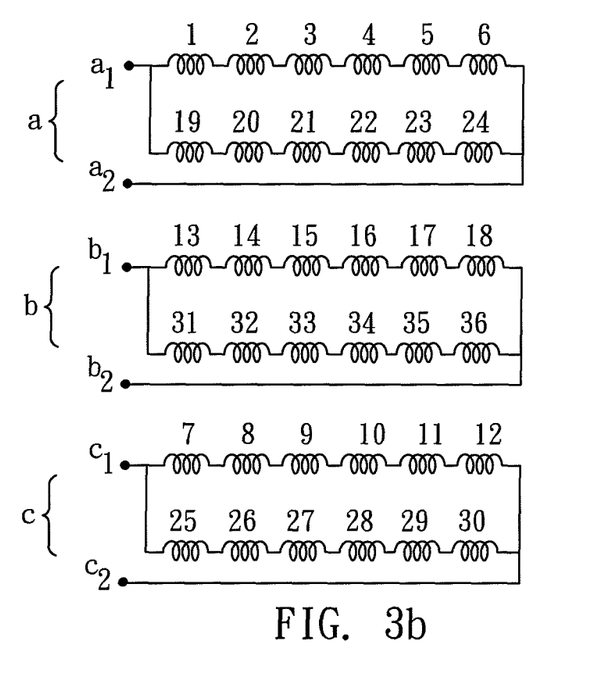
FIG. 3b is a schematic view illustrating the parallel-type three-phase stator winding connection adopted by the permanent magnet synchronous machine module with 38 poles and 36 slots in accordance with the first embodiment of the present invention.

To be more specific, the three-phase connection can be a parallel three-phase connection or a serial three-phase connection. These two connections are illustrated in FIG. 3a and FIG. 3b, respectively. With reference to FIG. 3a, FIG. 3a is a schematic view illustrating the serial-type three-phase stator winding connection adopted by the permanent magnet synchronous machine module with 38 poles and 36 slots in accordance with the first embodiment of the present invention. The aforementioned parallel three-phase connection allows the permanent magnet synchronous machine module with 38 poles and 36 slots of the present invention to form a winding including an a-phase winding, a b-phase winding, and a c-phase winding, so as to construct a parallel three-phase permanent magnet synchronous machine. In details, by connecting the coils wound on the $1^{st}$ tooth part, the $2^{nd}$ tooth part, the $3^{rd}$ tooth part, the $4^{th}$ tooth part, the $5^{th}$ tooth part, the $6^{th}$ tooth part, the $19^{th}$ tooth part, the $20^{th}$ tooth part, the $21^{st}$ tooth part, the $22^{nd}$ tooth part, the $23^{rd}$ tooth part, and the $24^{th}$ tooth part of the stator unit (112) in order, the a-phase winding is formed; by connecting the coils wound on the $13^{th}$ tooth part, the $14^{th}$ tooth part, the $15^{th}$ tooth part, the $16^{th}$ tooth part, the $17^{th}$ tooth part, the $18^{th}$ tooth part, the $31^{st}$ tooth part, the $32^{nd}$ tooth part, the $33^{rd}$ tooth part, the $34^{th}$ tooth part, the $35^{th}$ tooth part, and the $36^{th}$ tooth part of the stator unit (112) in order, the b-phase winding is formed; by connecting the coils wound on the $7^{th}$ tooth part, the $8^{th}$ tooth part, the $9^{th}$ tooth part, the $10^{th}$ tooth part, the $11^{th}$ tooth part, the $12^{th}$ tooth part, the $25^{th}$ tooth part, the $26^{th}$ tooth part, the $27^{th}$ tooth part, the $28^{th}$ tooth part, the $29^{th}$ tooth part, and the $30^{th}$ tooth part of the stator unit (112) in order, the c-phase winding is formed. It is noted that the permanent magnet synchronous machine module with 38 poles and 36 slots of the present invention forms a serial three-phase permanent magnet synchronous machine according to the connection illustrated in FIG. 3a. Besides, the phase difference between every two of the a-phase winding, the b-phase winding, and the c-phase winding is 120°.

With reference to FIG. 3b, FIG. 3b is a schematic view illustrating the parallel-type three-phase stator winding connection adopted by the permanent magnet synchronous machine module with 38 poles and 36 slots in accordance with the first embodiment of the present invention. The aforementioned serial three-phase connection allows the permanent magnet synchronous machine module with 38 poles and 36 slots of the present invention to form a winding—including an a-phase winding, a b-phase winding, and a c-phase winding—so as to construct a serial three-phase permanent magnet synchronous machine. In details, by connecting the coils wound on the $1^{st}$ tooth part, the $2^{nd}$ tooth part, the $3^{rd}$ tooth part, the $4^{th}$ tooth part, the $5^{th}$ tooth part, and the $6^{th}$ tooth part of the stator unit (112) in order, an $a_1$ winding is formed, and by connecting the coils wound on the $19^{th}$ tooth part, the $20^{th}$ tooth part, the $21^{st}$ tooth part, the $22^{nd}$ tooth part, the $23^{rd}$ tooth part, and the $24^{th}$ tooth part of the stator unit (112) in order, an $a_2$ winding is formed, wherein the $a_1$ winding and the $a_2$ winding are connected in parallel to form the a-phase winding; by connecting the coils wound on the $13^{th}$ tooth part, the $14^{th}$ tooth part, the $15^{th}$ tooth part, the $16^{th}$ tooth part, the $17^{th}$ tooth part, and the $18^{th}$ tooth part of the stator unit (112) in order, a $b_1$ winding is formed, and by connecting the coils wound on the $31^{st}$ tooth part, the $32^{nd}$ tooth part, the $33^{rd}$ tooth part, the $34^{th}$ tooth part, the $35^{th}$ tooth part, and the $36^{th}$ tooth part of the stator unit (112) in order, a $b_2$ winding is formed, wherein the $b_1$ winding and the $b_2$ winding are connected in parallel to form the b-phase winding; by connecting the coils wound on the $7^{th}$ tooth part, the $8^{th}$ tooth part, the $9^{th}$ tooth part, the $10^{th}$ tooth part, the $11^{th}$ tooth part, and the $12^{th}$ tooth part of the stator unit (112) in order, a $c_1$ winding is formed, and by connecting the coils wound on the $25^{th}$ tooth part, the $26^{th}$ tooth part, the $27^{th}$ tooth part, the $28^{th}$ tooth part, the $29^{th}$ tooth part, and the $30^{th}$ tooth part of the stator unit (112) in order, a $c_2$ winding is formed, wherein the $c_1$ winding and the $c_2$ winding are connected in parallel to form the c-phase winding. It is noted that the 38 poles 36 slots permanent magnet synchronous machine module of the present invention forms a parallel three-phase permanent magnet synchronous machine according to the connection illustrated in FIG. 3b. Besides, the phase difference between every two of the a-phase winding, the b-phase winding, and the c-phase winding is 120°.

Moreover, when the permanent magnet synchronous machine module with 38 poles and 36 slots of the present invention is switched to six-phase by the switching device (23), the switching device (23) arranges the 72 connection ends in six-phase connection so as to achieve the efficiency of six-phase.

Figure 4:
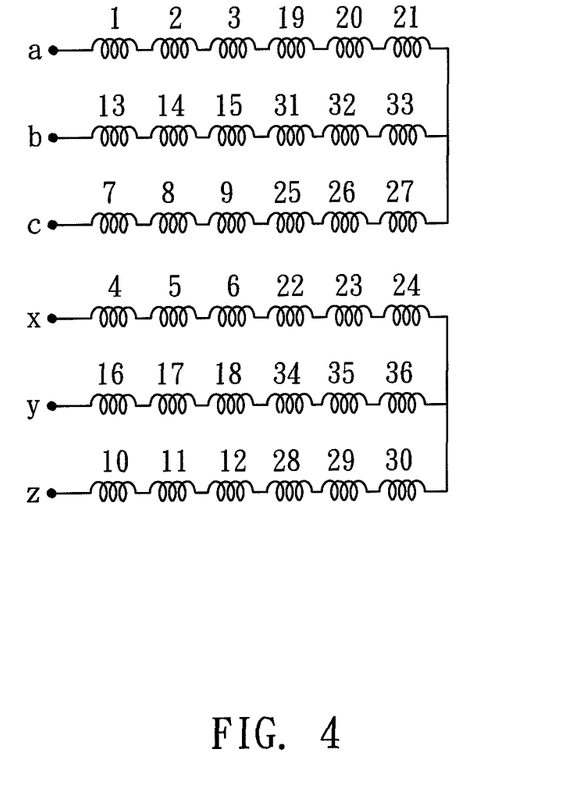
FIG. 4 is a schematic view illustrating the six-phase stator winding connection adopted by the permanent magnet synchronous machine module with 38 poles and 36 slots in accordance with the first embodiment of the present invention.

As shown in FIG. 4, the aforementioned six-phase connection allows the permanent magnet synchronous machine module with 38 poles and 36 slots of the present invention to form a first winding including an a-phase winding, a b-phase winding, and a c-phase winding, and a second winding including an x-phase winding, a y-phase winding, and a z-phase winding, so as to construct a six-phase permanent magnet synchronous machine. In details, by connecting the coils wound on the $1^{st}$ tooth part, the $2^{nd}$ tooth part, the $3^{rd}$ tooth part, the $19^{th}$ tooth part, the $20^{th}$ tooth part, and the $21^{st}$ tooth part of the stator unit (112) in order, the a-phase winding is formed; by connecting the coils wound on the $13^{th}$ tooth part, the $14^{th}$ tooth part, the $15^{th}$ tooth part, the $31^{st}$ tooth part, the $32^{nd}$ tooth part, and the $33^{rd}$ tooth part of the stator unit (112) in order, the b-phase winding is formed; by connecting the coils wound on the $7^{th}$ tooth part, the $8^{th}$ tooth part, the $9^{th}$ tooth part, the $25^{th}$ tooth part, the $26^{th}$ tooth part, and the $27^{th}$ tooth part of the stator unit (112) in order, the c-phase winding is formed. Additionally, by connecting the coils wound on the $4^{th}$ tooth part, the $5^{th}$ tooth part, the $6^{th}$ tooth part, the $22^{nd}$ tooth part, the $23^{rd}$ tooth part, and the $24^{th}$ tooth part of the stator unit (112) in order, the x-phase winding is formed; by connecting the coils wound on the $16^{th}$ tooth part, the $17^{th}$ tooth part, the $18^{th}$ tooth part, the $34^{th}$ tooth part, the $35^{th}$ tooth part, and the $36^{th}$ tooth part of the stator unit (112) in order, the y-phase winding is formed; by connecting the coils wound on the $10^{th}$ tooth part, the $11^{th}$ tooth part, the $12^{th}$ tooth part, the $28^{th}$ tooth part, the $29^{th}$ tooth part, and the $30^{th}$ tooth part of the stator unit (112) in order, the z-phase winding is formed. It is noted that the permanent magnet synchronous machine module with 38 poles and 36 slots of the present invention forms a six-phase permanent magnet synchronous machine according to the connection illustrated in FIG. 4. Furthermore, the phase difference between every two of the x-phase winding, the y-phase winding, and the z-phase winding of the second winding are 120°, and the phase difference between the a-phase winding of the first winding and the x-phase winding of the second winding is 30°.

In addition, when the permanent magnet synchronous machine module with 38 poles and 36 slots of the present invention is switched to nine-phase by the switching device (23), the switching device (23) arranges the 72 connection ends in nine-phase connection so as to achieve the efficiency of nine-phase.

Figure 5:
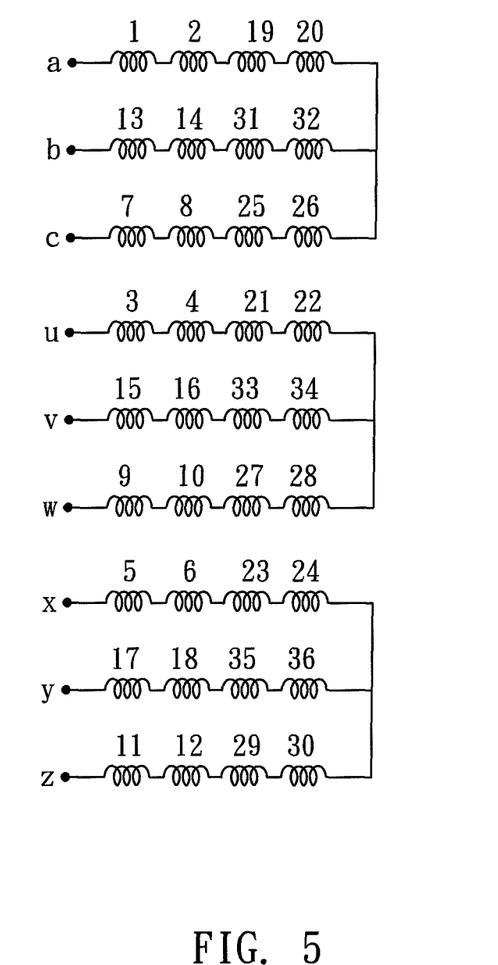
FIG. 5 is a schematic view illustrating the nine-phase stator winding connection adopted by the permanent magnet synchronous machine module with 38 poles and 36 slots in accordance with the first embodiment of the present invention.

As shown in FIG. 5, the aforementioned nine-phase connection allows the permanent magnet synchronous machine module with 38 poles and 36 slots of the present invention to form a first winding including an a-phase winding, a b-phase winding, and a c-phase winding, a second winding including a u-phase winding, a v-phase winding, and a w-phase winding, and a third winding including an x-phase winding, a y-phase winding, and a z-phase winding, so as to construct a nine-phase permanent magnet synchronous machine. In details, by connecting the coils wound on the $1^{st}$ tooth part, the $2^{nd}$ tooth part, the $19^{th}$ tooth part, and the $20^{th}$ tooth part of the stator unit (112) in order, the a-phase winding is formed; by connecting the coils wound on the $13^{th}$ tooth part, the $14^{th}$ tooth part, the $31^{st}$ tooth part, and the $32^{nd}$ tooth part of the stator unit (112) in order, the b-phase winding is formed; by connecting the coils wound on the $7^{th}$ tooth part, the $8^{th}$ tooth part, the $25^{th}$ tooth part, and the $26^{th}$ tooth part of the stator unit (112) in order, the c-phase winding is formed. Additionally, by connecting the coils wound on the $5^{th}$ tooth part, the $6^{th}$ tooth part, the $23^{rd}$ tooth part, and the $24^{th}$ tooth part of the stator unit (112) in order, the x-phase winding is formed; by connecting the coils wound on the $17^{th}$ tooth part, the $18^{th}$ tooth part, the $35^{th}$ tooth part, and the $36^{th}$ tooth part of the stator unit (112) in order, the y-phase winding is formed; by connecting the coils wound on the $11^{th}$ tooth part, the $12^{th}$ tooth part, the $29^{th}$ tooth part, and the $30^{th}$ tooth part of the stator unit (112) in order, the z-phase winding is formed. Moreover, by connecting the coils wound on the $3^{rd}$ tooth part, the $4^{th}$ tooth part, the $21^{st}$ tooth part, and the $22^{nd}$ tooth part of the stator unit (112) in order, the u-phase winding is formed; by connecting the coils wound on the $15^{th}$ tooth part, the $16^{th}$ tooth part, the $33^{rd}$ tooth part, and the $34^{th}$ tooth part of the stator unit (112) in order, the v-phase winding is formed; by connecting the coils wound on the $9^{th}$ tooth part, the $10^{th}$ tooth part, the $27^{th}$ tooth part, the $28^{th}$ tooth part of the stator unit (112) in order, the w-phase winding is formed. It is noted that the permanent magnet synchronous machine module with 38 poles and 36 slots of the present invention forms a nine-phase permanent magnet synchronous machine according to the connection illustrated in FIG. 5. Furthermore, the phase difference between every two of the u-phase winding, the v-phase winding, and the w-phase winding of the third winding is 120°, and the phase difference between the u-phase winding of the third winding and the x-phase winding of the second winding is 20°.

Additionally, in the aforementioned multi-phase stator winding connections (three-phase, six-phase, and nine-phase connection), the winding direction and the turn number on each tooth part are identical. Therefore, with external connection pattern of the coils, the present invention is able to form a permanent magnet synchronous machine module with 38 poles and 36 slots capable of switching to three-phase, six-phase, or nine-phase.

Therefore, the switching device (23) switches the permanent magnet synchronous machine module with 38 poles and 36 slots of the present invention to three-phase, six-phase, or nine-phase, which enables the permanent magnet synchronous machine module with 38 poles and 36 slots of the present invention to be switched arbitrarily to satisfy different application requirements.

In conclusion, two connection ends are dragged from the coil (21) wound on each tooth part (1123) to the switching device (23), allowing the permanent magnet synchronous machine module with 38 poles and 36 slots of the present invention to be switched to different phases. For instance, the switching device (23) connects the connection ends of the coil (21) as shown in FIG. 3a or FIG. 3b when the permanent magnet synchronous machine module with 38 poles and 36 slots of the present invention is switched to three-phase; the switching device (23) connects the connection ends of the coil (21) as shown in FIG. 4 when the permanent magnet synchronous machine module with 38 poles and 36 slots of the present invention is switched to six-phase; the switching device (23) connects the connection ends of the coil (21) as shown in FIG. 5 when the permanent magnet synchronous machine module with 38 poles and 36 slots of the present invention is switched to nine-phase.

Embodiment 2

34 Poles 36 Slots Permanent Magnet Synchronous Machine Module

Figure 6:
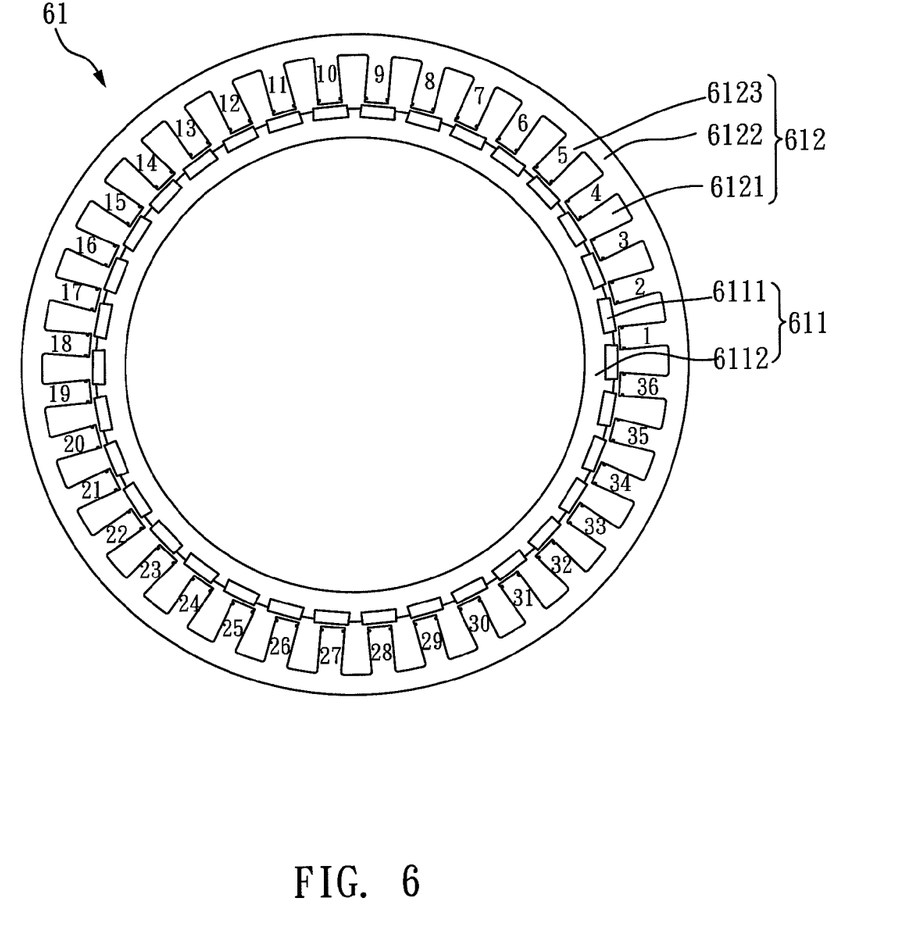
FIG. 6 is a schematic view illustrating the permanent magnet synchronous machine module with a slot/pole combination of 34 poles and 36 slots in accordance with the second embodiment of the present invention.

With reference to FIG. 6, FIG. 6 is a schematic view illustrating the permanent magnet synchronous machine module with a slot/pole combination of 34 poles and 36 slots in accordance with the second embodiment of the present invention. As shown in FIG. 6, in the permanent magnet synchronous machine module (61) with 34 poles and 36 slots in accordance with the second embodiment of the present invention, there are 34 rotor magnets (6111) disposed on the rotor unit (611) of the module (61). The 34 rotor magnets (6111) are made of permanent magnets, and the material thereof can be NdFeB or ferrite.

It should be noted that the material of these permanent magnets may include, but is not limited to, NdFeB, ferrite, SmCo, AlNiCo or the like. The aforementioned 34 rotor magnets (6111) are preferably made of NdFeB. Moreover, the rotor unit (611) has a rotor steel sheet (6112) located at the inner side of the 34 rotor magnets (6111) for increasing the operation efficiency of the permanent magnet synchronous machine module (61).

On the other hand, as shown in FIG. 6, there are 36 slots (6121) disposed on the permanent magnet synchronous machine module (61), and a tooth part (6123) is provided between every two adjacent slots (6121); i.e., the stator unit (612) has 36 tooth parts (6123). Additionally, the stator unit (612) has a stator steel sheet (6122) disposed at the outer side of these 36 slots (6121). Besides, each tooth part (6123) has a coil wound thereon. The arrangement of 34 poles and 36 slots employed in the permanent magnet synchronous machine module of the present invention allows the 36 coils wound on the tooth parts (6123) to be connected with each other in a multi-phase stator winding connection, thereby enabling the permanent magnet synchronous machine module with 34 poles and 36 slots in accordance with the second embodiment of the present invention to be able to switch to three-phase, six-phase, or nine-phase, so as to connect in parallel to utility power with different voltage of 110/220/440V. It should be further noted that the aforementioned rotor steel sheet (1112) and the stator steel sheet (1122) are provided only for increasing the efficiency of the permanent magnet synchronous machine module with 38 poles and 36 slots in accordance with the second embodiment of the present invention, but are not essential elements for completing the purpose of switching to three-phase, six-phase, or nine-phase.

It is worth to be noted again that the implementation of the permanent magnet synchronous machine module with 34 poles and 36 slots in accordance with the second embodiment of the present invention is the same as that of the permanent magnet synchronous machine module with 38 poles and 36 slots in accordance with the first embodiment of the present invention, wherein both of the embodiments employ the slot/pole combination to achieve the function of being capable of switching to three-phase, six-phase, and nine-phase.

The difference between the two embodiments is that: if the slot/pole combination of 34 poles and 36 slots is selected, the connections (three-phase, six-phase, and nine-phase connection) for this embodiment are similar to the connections as shown in FIG. 3a, FIG. 3b, FIG. 4, and FIG. 5, except that the b-phase and the c-phase in FIG. 3a, FIG. 3b, FIG. 4, and FIG. 5 are exchanged, so as to be suitable for use in the slot/pole combination of 34 poles and 36 slots.

Embodiment 3

38 Poles 36 Slots Composite Permanent Magnet Synchronous Machine

Figure 7:
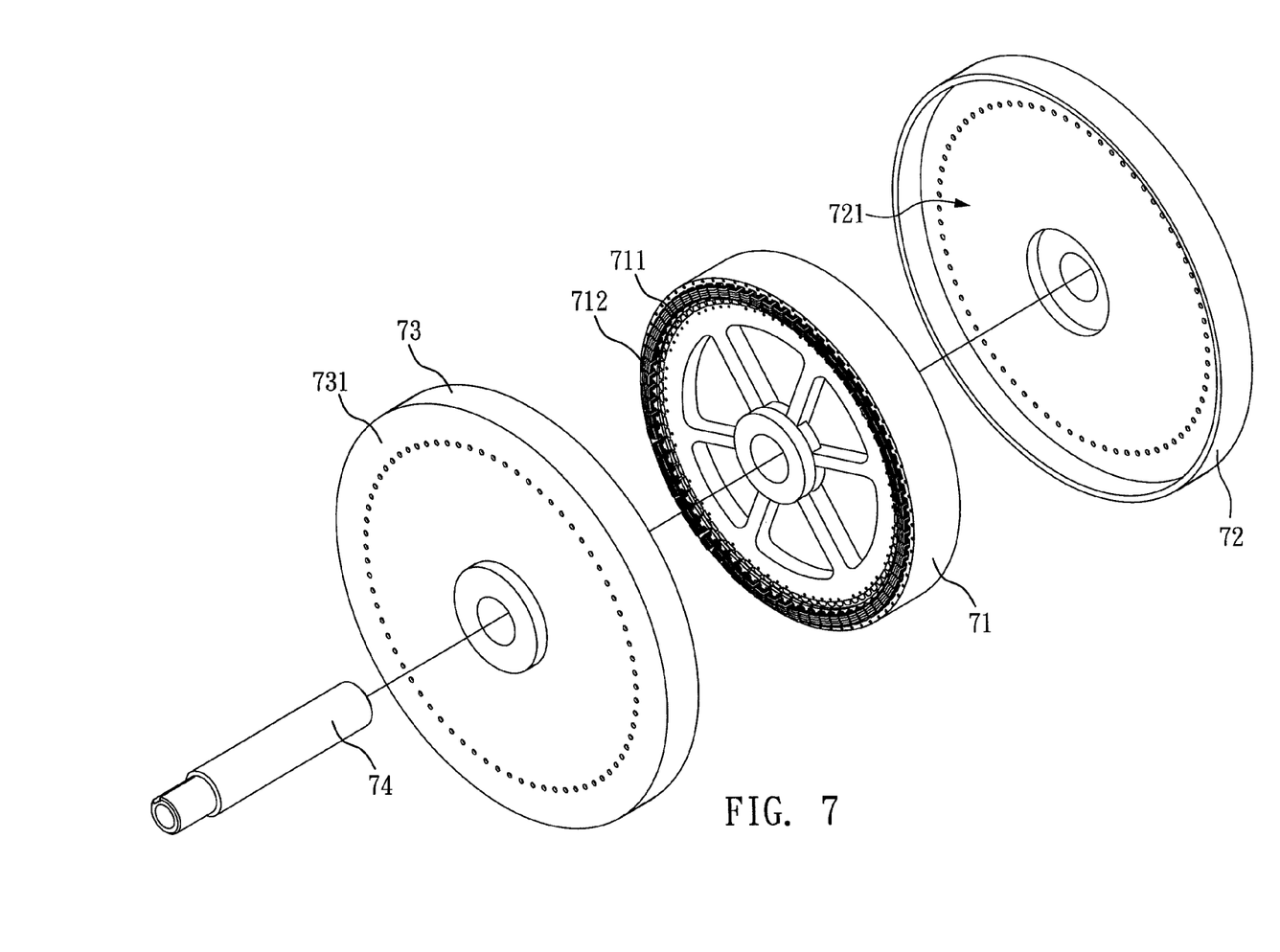
FIG. 7 is an exploded view illustrating the composite permanent magnet synchronous machine in accordance with the third embodiment of the present invention.

With reference to FIG. 7, FIG. 7 is an exploded view illustrating the composite permanent magnet synchronous machine in accordance with the third embodiment of the present invention. As shown in FIG. 7, the composite permanent magnet synchronous machine of the present invention includes: a permanent magnet synchronous machine module (71), a bottom base 72, a top cover (73), and a shaft (74). In addition, the permanent magnet synchronous machine module (71) includes a rotor unit (711) and a stator unit (712), wherein the stator unit (712) surrounds the rotor unit (711) to form an inner-rolling structure as known in the art. Moreover, the bottom base 72 has an accommodation space (721). As shown in FIG. 7, the top cover (73) is assembled with the bottom base 72 to receive the permanent magnet synchronous machine module (71) in between the bottom base 72 and the top cover (73). Furthermore, the top cover (73) has a front surface (731), and the shaft (74) penetrates through the front surface (731) for being connected with the rotor unit (711).

It is noted that the permanent magnet synchronous machine module with 38 poles and 36 slots as described in the first embodiment or the permanent magnet synchronous machine module with 34 poles and 36 slots as described in the second embodiment can all be selected as the permanent magnet synchronous machine module (71) for the composite permanent magnet synchronous machine of the present invention. For illustrative purpose, the permanent magnet synchronous machine module with 38 poles and 36 slots as described in the first embodiment is preferably selected in this embodiment.

With the description in the first embodiment, it is known that the aforementioned winding connection is employed in the composite permanent magnet synchronous machine of the present invention for the 36 coils wound on the tooth parts, so as to carry out the switching operation among three-phase, six-phase, and nine-phase with a switching device, thereby allowing the composite permanent magnet synchronous machine of the present invention to be connected in parallel to the utility power with different voltage of 110/220/440V. Moreover, the composite permanent magnet synchronous machine of the present invention has an extremely wide range of application. For example, it is suitable for use in wind power generation systems, and also suitable for use in ocean current generators. Furthermore, the composite permanent magnet synchronous machine of the present invention can be applied into electric vehicles, general cooling fans, pumps, and so on when it is used as an electric motor. In view of the foregoing, it is known that the application of the composite permanent magnet synchronous machine of the present invention is relatively wide.

Additionally, the composite permanent magnet synchronous machine of the present invention is suitable for use in any kind of generator or electric motor system due to the property of being capable of switching to three-phase, six-phase, and nine-phase, which permits the generator or electric motor system to reach high efficiency and high stability.

In addition, the composite permanent magnet synchronous machine of the present invention can also be used as a generator in cooperation with a full-bridge diode rectifier, so as to connect in parallel with utility power with different voltages of 110/220/440V. As a result, the DC-bus current and the voltage ripple component of a generator can be reduced without additional control, thereby decreasing the jitter and noise of a generator. Meanwhile, the capacity of a DC capacitor and manufacturing cost for a generator can also be reduced. The composite permanent magnet synchronous machine of the present invention can further be used with a thin film capacitor for prolonging the lifetime of a generator.

Moreover, when the composite permanent magnet synchronous machine of the present invention is applied in a wind power generation system and is under a low wind speed condition, the first three-phase winding can be connected in series with the second three-phase winding in the parallel three-phase connection or six-phase connection, so as to increase the induced electromotive force, which implies that the abc-winding is connected with xyz-winding in series in the six-phase connection; or the $a_1$ winding, the $b_1$ winding and the $c_1$ winding are connected with the $a_2$ winding, the $b_2$ winding and the $c_2$ winding in series, respectively, in the parallel three-phase connection. Under high wind speed condition, the first three-phase winding can be connected in parallel with the second three-phase winding in the parallel three-phase connection or six-phase connection so as to satisfy the demand of the load end, which implies that the abc-winding is connected with xyz-winding in parallel in the six-phase connection; or the $a_1$ winding, the $b_1$ winding and the $c_1$ winding are connected with the $a_2$ winding, the $b_2$ winding and the $c_2$ winding in parallel, respectively, in the parallel three-phase connection. The excessive induced electrical energy can be stored in an additional battery accompanied therewith, so as to reach high efficiency and application diversity. The aforementioned battery can be, for example, a lead-acid battery or a lithium-ion battery.

In summary, the composite permanent magnet synchronous machine of the present invention utilizes a particular slot/pole combination (such as the structure of 38 poles and 36 slots, and the structure of 34 poles and 36 slots mentioned above) accompanied with difference connections to achieve a composite permanent magnet synchronous machine capable of switching to three-phase, six-phase, and nine-phase. With the use of a switching device, it can be switched to three-phase, six-phase, or nine-phase easily by changing the connection. Moreover, since the composite permanent magnet synchronous machine of the present invention includes three different phases for switching, the composite permanent magnet synchronous machine of the present invention can be used for a generator, wherein the ripple effect of the generator can be reduced and the noise of the generator in operation can be reduced as well, thereby increasing the output efficiency of the generator.

For example, when the composite permanent magnet synchronous machine of the present invention is switched from three-phase to six-phase, the abc-winding connection (as shown in FIG. 3a or FIG. 3b) in three-phase is changed to the abc-winding and xyz-winding connection (as shown in FIG. 4) in six-phase. As a result, the ±440V voltage swing in three-phase can be reduced to ±220V voltage swing in six-phase. Accordingly, the ripple effect on the ±440V voltage swing is thus suppressed. Furthermore, when the composite permanent magnet synchronous machine of the present invention is switched from six-phase to nine-phase, the abc-winding and xyz-winding connection (as shown in FIG. 4) in six-phase are changed to the abc-winding, the xyz-winding, and the uvw-winding connection (as shown in FIG. 5). As a result, the ±220V voltage swing in six-phase can be reduced to ±110V voltage swing in nine-phase. Accordingly, the ripple effect on the ±220V voltage swing is thus suppressed, and the efficiency of reducing ripple effect is achieved.

It is worth to be noted once again that the aforementioned three-phase/six-phase/nine-phase connection is exemplary based on a slot/pole combination of 38 poles and 36 slots. If the slot/pole combination of 34 poles and 36 slots is selected, the connections (three-phase, six-phase, and nine-phase connection) are similar to the connections as shown in FIG. 3a, FIG. 3b, FIG. 4, and FIG. 5, except that the b-phase and the c-phase in FIG. 3a, FIG. 3b, FIG. 4, and FIG. 5 are exchanged with each other, so as to be suitable for use in the slot/pole combination of 34 poles and 36 slots.

In addition, the composite permanent magnet synchronous machine of the present invention is suitable for use in a wind power generator system. It can be coupled with a low-speed windmill without an additional speed-up gearbox. Moreover, at a rated rotation speed, one single generator can achieve the purpose of connecting in parallel with the utility power with different voltage of 110/220/440V, so as to improve the traditional three-phase stator winding connection, and also to reduce the ripple factor of a generator, thereby reducing the noise of the generator in operation and increasing the output efficiency thereof simultaneously.

It is noted that the slot/pole combination of the permanent magnet synchronous machine module (or the composite permanent magnet synchronous machine) of the present invention is not limited to the slot/pole combination as described in the above embodiments (which are the 38 poles and 36 slots, and the 34 poles and 36 slots as described in the first and the second embodiments, respectively). However, the slot/pole combination with more poles and more slots can be selected based on the actual requirement. For example, 76 poles and 72 slots can be selected if the slot/pole combination of 38 poles and 36 slots is considered as a basis, or 68 poles and 72 slots can also be selected if the slot/pole combination of 34 poles and 36 slots is considered as a basis.

Furthermore, the permanent magnet synchronous machine module (or the composite permanent magnet synchronous machine) of the present invention is not limited to a specific form. However, the permanent magnet synchronous machine module can be a radial magnetic flux type permanent magnet synchronous machine module in the aforementioned embodiments, wherein the rotor unit thereof is a radial rotor unit, and the stator unit thereof is a radial stator unit.

Moreover, the rotor unit is preferably an inner-rolling rotor unit or an outer-rolling rotor unit, and the stator unit is preferably an inner-rolling stator unit or an outer-rolling stator unit.

In addition, the rotor unit preferably includes a radial rotor steel sheet, and the stator unit preferably includes a radial stator steel sheet, wherein the radial rotor steel sheet and the radial stator steel sheet are preferably made of steel sheet or composite soft magnetic material. Furthermore, the thickness of the radial rotor steel sheet and the radial stator steel sheet is preferably between 0.13 mm and 0.6 mm.

With the above description, it is known that slot/pole combination of 38 poles and 36 slots or 34 poles and 36 slots can be selected as a basis (but not limited to the two slot/pole combinations as described, multiple times of the slot/pole combination of the two combinations are applicable as well) for the permanent magnet synchronous machine module (or the composite permanent magnet synchronous machine) of the present invention. By the selected slot/pole combination, the coils wound on the tooth parts can be connected as various connections to have three-phase, six-phase, and nine-phase, and the connection as mentioned is the multi-phase stator winding connection described in the first embodiment, which is further divided into the aforementioned three-phase, six-phase, and nine-phase connection. Additionally, the permanent magnet synchronous machine module (or the composite permanent magnet synchronous machine) of the present invention can be used with a switching device, and the switching device is provided for switching the permanent magnet synchronous machine module (or the composite permanent magnet synchronous machine) of the present invention to three-phase, six-phase, or nine-phase for connecting in parallel with the utility power with different voltage of 110/220/440V. It is worth to be noted that the aforementioned three-phase connection can be a parallel type three-phase connection or a serial type three-phase connection.

Although the present invention has been explained in relation to its preferred embodiment, it is to be understood that many other possible modifications and variations can be made without departing from the spirit and scope of the invention as hereinafter claimed.

What is claimed is:

1. A permanent magnet synchronous machine module comprising:
   a rotor unit with a plurality of rotor magnets; and
   a stator unit with a plurality of slots surrounding the rotor unit, the stator includes $1^{st}$ to $36^{th}$ tooth parts,
   wherein the number of the rotor magnets for said rotor unit is P and the number of the slots for said stator unit is S; a tooth part is provided between every two adjacent slots and a coil is wound on the tooth part,
   wherein P and S are 38N and 36N, respectively, and N is a positive integer; or P and S are 34M and 36M, respectively, and M is a positive integer;
   a switching device connected with the coils wound on the tooth part for switching the permanent magnet synchronous machine module to a different phase by connecting the coils as one of three-phase connection, six-phase connection and nine-phase connection;
   when under a condition of N=1 and M=1, the nine-phase connection allows the permanent magnet synchronous machine module to form a first winding including an a-phase winding, a b-phase winding, and a c-phase winding, a second winding including a u-phase winding, a v-phase winding, and a w-phase winding, and a third winding including an x-phase winding, a y-phase winding, and a z-phase winding;
   wherein in the nine-phase connection, the a-phase winding is formed by connecting the coils wound on the $1^{st}$ tooth part, the $2^{nd}$ tooth part, the $19^{th}$ tooth part, and the $20^{th}$ tooth part of the stator unit; the b-phase winding is formed by connecting the coils wound on the $13^{th}$ tooth part, the $14^{th}$ tooth part, the $31^{st}$ tooth part, and the $32^{nd}$ tooth part of the stator unit; the c-phase winding is formed by connecting the coils wound on the $7^{th}$ tooth part, the $8^{th}$ tooth part, the $25^{th}$ tooth part, and the $26^{th}$ tooth part of the stator unit; the x-phase winding is formed by connecting the coils wound on the $5^{th}$ tooth part, the $6^{th}$ tooth part, the $23^{rd}$ tooth part, and the $24^{th}$ tooth part of the stator unit; the y-phase winding is formed by connecting the coils wound on the $17^{th}$ tooth part, the $18^{th}$ tooth part, the $35^{th}$ tooth part, and the $36^{th}$ tooth part of the stator unit; the z-phase winding is formed by connecting the coils wound on the $11^{th}$ tooth part, the $12^{th}$ tooth part, the $29^{th}$ tooth part, and the $30^{th}$ tooth part of the stator unit; the u-phase winding is formed by connecting the coils wound on the $3^{rd}$ tooth part, the $4^{th}$ tooth part, the $21^{st}$ tooth part, and the $22^{nd}$ tooth part of the stator unit; the v-phase winding is formed by connecting the coils wound on the $15^{th}$ tooth part, the $16^{th}$ tooth part, the $33^{rd}$ tooth part, and the $34^{th}$ tooth part of the stator unit; the w-phase winding is formed by connecting the coils wound on the $9^{th}$ tooth part, the $10^{th}$ tooth part, the $27^{th}$ tooth part, and the $28^{th}$ tooth part of the stator unit.

2. The permanent magnet synchronous machine module as claimed in claim 1, wherein the rotor unit has a rotor steel sheet and the stator unit has a stator steel sheet; the rotor steel sheet and the stator steel sheet are composed of steel sheet or composite soft magnetic material.

3. The permanent magnet synchronous machine module as claimed in claim 1, wherein the rotor unit is an inner-rotator type radial rotor unit, or an outer-rotator type radial rotor unit.

4. A composite permanent magnet synchronous machine comprising:
   a permanent magnet synchronous machine module having a rotor unit with a plurality of rotor magnets and a stator unit with a plurality of slots surrounding the rotor unit, the stator includes $1^{st}$ to $36^{th}$ tooth parts,
   a bottom base having an accommodation space;
   a top cover having a front surface assembled with the bottom base so as to accommodate the permanent magnet synchronous machine module in between the bottom base and the top cover; and
   a shaft penetrating through the front surface and connected with the rotor unit, wherein the number of the rotor magnets for the rotor unit is P and the number of the slots for the stator unit is S; a tooth part is provided between every two adjacent slots and a coil is wound on the tooth part,
   wherein P and S are 38N and 36N, respectively, and N is a positive integer; or P and S are 34M and 36M, respectively, and M is a positive integer;
   a switching device connected with the coils wound on the tooth part for switching the permanent magnet synchronous machine module to a different phase by connecting the coils as one of three-phase connection, six-phase connection and nine-phase connection;
   when under a condition of N=1 and M=1, the nine-phase connection allows the permanent magnet synchronous machine module to form a first winding including an a-phase winding, a b-phase winding, and a c-phase winding, a second winding including a u-phase winding, a v-phase winding, and a w-phase winding, and a third winding including an x-phase winding, a y-phase winding, and a z-phase winding;
   wherein in the nine-phase connection, the a-phase winding is formed by connecting the coils wound on the $1^{st}$ tooth part, the $2^{nd}$ tooth part, the $19^{th}$ tooth part, and the $20^{th}$ tooth part of the stator unit; the b-phase winding is formed by connecting the coils wound on the $13^{th}$ tooth part, the $14^{th}$ tooth part, the $31^{st}$ tooth part, and the $32^{nd}$ tooth part of the stator unit; the c-phase winding is formed by connecting the coils wound on the $7^{th}$ tooth part, the $8^{th}$ tooth part, the $25^{th}$ tooth part, and the $26^{th}$ tooth part of the stator unit; the x-phase winding is formed by connecting the coils wound on the $5^{th}$ tooth part, the $6^{th}$ tooth part, the $23^{rd}$ tooth part, and the $24^{th}$ tooth part of the stator unit; the y-phase winding is formed by connecting the coils wound on the $17^{th}$ tooth part, the $18^{th}$ tooth part, the $35^{th}$ tooth part, and the $36^{th}$ tooth part of the stator unit; the z-phase winding is formed by connecting the coils wound on the $11^{th}$ tooth part, the $12^{th}$ tooth part, the $29^{th}$ tooth part, and the $30^{th}$ tooth part of the stator unit; the u-phase winding is formed by connecting the coils wound on the $3^{rd}$ tooth part, the $4^{th}$ tooth part, the $21^{st}$ tooth part, and the $22^{nd}$ tooth part of the stator unit; the v-phase winding is formed by connecting the coils wound on the $15^{th}$ tooth part, the $16^{th}$ tooth part, the $33^{rd}$ tooth part, and the $34^{th}$ tooth part of the stator unit; the w-phase winding is formed by connecting the coils wound on the $9^{th}$ tooth part, the $10^{th}$ tooth part, the $27^{th}$ tooth part, and the $28^{th}$ tooth part of the stator unit.

5. The composite permanent magnet synchronous machine as claimed in claim 4, wherein the rotor unit has a rotor steel sheet and the stator unit has a stator steel sheet; the rotor steel sheet and the stator steel sheet are composed of steel sheet or composite soft magnetic material.

6. The composite permanent magnet synchronous machine as claimed in claim 4, wherein the rotor unit is an inner-rotator type radial rotor unit, or an outer-rotator type radial rotor unit.

7. A permanent magnet synchronous machine module comprising:
- a rotor unit with a plurality of rotor magnets; and
- a stator unit with a plurality of slots surrounding the rotor unit, the stator includes $1^{st}$ to $36^{th}$ tooth parts,
  - wherein the number of the rotor magnets for said rotor unit is P and the number of the slots for said stator unit is S; a tooth part is provided between every two adjacent slots and a coil is wound on the tooth part,
  - wherein P and S are 38N and 36N, respectively, and N is a positive integer; or P and S are 34M and 36M, respectively, and M is a positive integer;
- a switching device connected with the coils wound on the tooth part for switching the permanent magnet synchronous machine module to a different phase by connecting the coils as one of three-phase connection, six-phase connection and nine-phase connection;
- wherein, when under the condition of N=1 and M=1, the three-phase connection allows the permanent magnet synchronous machine module to form a first winding including an a-phase winding, a b-phase winding, and a c-phase winding;
- wherein the a-phase winding is formed by connecting the coils wound on the $1^{st}$ tooth part, the $2^{nd}$ tooth part, the $3^{rd}$ tooth part, the $4^{th}$ tooth part, the $5^{th}$ tooth part, the $6^{th}$ tooth part, the $19^{th}$ tooth part, the $20^{th}$ tooth part, the $21^{st}$ tooth part, the $22^{nd}$ tooth part, the $23^{rd}$ tooth part, and the $24^{th}$ tooth part of the stator unit; the b-phase winding is formed by connecting the coils wound on the $13^{th}$ tooth part, the $14^{th}$ tooth part, the $15^{th}$ tooth part, the $16^{th}$ tooth part, the $17^{th}$ tooth part, the $18^{th}$ tooth part, the $31^{st}$ tooth part, the $32^{nd}$ tooth part, the $33^{rd}$ tooth part, the $34^{th}$ tooth part, the $35^{th}$ tooth part, and the $36^{th}$ tooth part of the stator unit; the c-phase winding is formed by connecting the coils wound on the $7^{th}$ tooth part, the $8^{th}$ tooth part, the $9^{th}$ tooth part, the $10^{th}$ tooth part, the $11^{th}$ tooth part, the $12^{th}$ tooth part, the $25^{th}$ tooth part, the $26^{th}$ tooth part, the $27^{th}$ tooth part, the $28^{th}$ tooth part, the $29^{th}$ tooth part, and the $30^{th}$ tooth part of the stator unit.

8. A permanent magnet synchronous machine module comprising:
- a rotor unit with a plurality of rotor magnets; and
- a stator unit with a plurality of slots surrounding the rotor unit, the stator includes $1^{st}$ to $36^{th}$ tooth parts,
  - wherein the number of the rotor magnets for said rotor unit is P and the number of the slots for said stator unit is S; a tooth part is provided between every two adjacent slots and a coil is wound on the tooth part,
  - wherein P and S are 38N and 36N, respectively, and N is a positive integer; or P and S are 34M and 36M, respectively, and M is a positive integer;
- a switching device connected with the coils wound on the tooth part for switching the permanent magnet synchronous machine module to a different phase by connecting the coils as one of three-phase connection, six-phase connection and nine-phase connection;
- wherein, when under the condition of N=1 and M=1, the six-phase connection allows the permanent magnet synchronous machine module to form a first winding including an a-phase winding, a b-phase winding, and a c-phase winding, and a second winding including an x-phase winding, a y-phase winding, and a z-phase winding;
- wherein the a-phase winding is formed by connecting the coils wound on the $1^{st}$ tooth part, the $2^{nd}$ tooth part, the $3^{rd}$ tooth part, the $19^{th}$ tooth part, the $20^{th}$ tooth part, and the $21^{st}$ tooth part of the stator unit; the b-phase winding is formed by connecting the coils wound on the $13^{th}$ tooth part, the $14^{th}$ tooth part, the $15^{th}$ tooth part, the $31^{st}$ tooth part, the $32^{nd}$ tooth part, and the $33^{rd}$ tooth part of the stator unit; the c-phase winding is formed by connecting the coils wound on the $7^{th}$ tooth part, the $8^{th}$ tooth part, the $9^{th}$ tooth part, the $25^{th}$ tooth part, the $26^{th}$ tooth part, and the $27^{th}$ tooth part of the stator unit; the x-phase winding is formed by connecting the coils wound on the $4^{th}$ tooth part, the $5^{th}$ tooth part, the $6^{th}$ tooth part, the $22^{nd}$ tooth part, the $23^{rd}$ tooth part, and the $24^{th}$ tooth part of the stator unit; the y-phase winding is formed by connecting the coils wound on the $16^{th}$ tooth part, the $17^{th}$ tooth part, the $18^{th}$ tooth part, the $34^{th}$ tooth part, the $35^{th}$ tooth part, and the $36^{th}$ tooth part of the stator unit; the z-phase winding is formed by connecting the coils wound on the $10^{th}$ tooth part, the $11^{th}$ tooth part, the $12^{th}$ tooth part, the $28^{th}$ tooth part, the $29^{th}$ tooth part, and the $30^{th}$ tooth part of the stator unit.

9. The permanent magnet synchronous machine module as claimed in claim 8, wherein, in the six-phase connection, the phase difference between every two of the x-phase winding, the y-phase winding, and the z-phase winding of the second winding are 120°, and the phase difference between the a-phase winding of the first winding and the x-phase winding of the second winding is 30°.

10. A composite permanent magnet synchronous machine comprising:
- a permanent magnet synchronous machine module having a rotor unit with a plurality of rotor magnets and a stator unit with a plurality of slots surrounding the rotor unit, the stator includes $1^{st}$ to $36^{th}$ tooth parts,
- a bottom base having an accommodation space;
- a top cover having a front surface assembled with the bottom base so as to accommodate the permanent magnet synchronous machine module in between the bottom base and the top cover; and
- a shaft penetrating through the front surface and connected with the rotor unit, wherein the number of the rotor magnets for the rotor unit is P and the number of the slots for the suitor unit is S; a tooth part is provided between every two adjacent slots and a coil is wound on the tooth part,
- wherein P and S are 38N and 36N, respectively, and N is a positive integer; or P and S are 34M and 36M, respectively, and M is a positive integer;
- a switching device connected with the coils wound on the tooth part for switching the permanent magnet synchronous machine module to a different phase by connecting the coils as one of three-phase connection, six-phase connection and nine-phase connection;
- wherein, when under the condition of N=1 and M=1, the three-phase connection allows the permanent magnet synchronous machine module to form a first winding including an a-phase winding, a b-phase winding, and a c-phase winding;
- wherein the a-phase winding is formed by connecting the coils wound on the $1^{st}$ tooth part, the $2^{nd}$ tooth part, the $3^{rd}$ tooth part, the $4^{th}$ tooth part, the $5^{th}$ tooth part, the $6^{th}$ part, the $19^{th}$ tooth part, the $20^{th}$ tooth part, the $21^{st}$ tooth part, the $22^{nd}$ tooth part, the $23^{rd}$ tooth part, and the $24^{th}$ tooth part of the stator unit; the b-phase winding is formed by connecting the coils wound on the $13^{th}$ tooth part, the $14^{th}$ tooth part, the $15^{th}$ tooth part, the $16^{th}$ tooth part, the $17^{th}$ tooth part, the $18^{th}$ tooth part, the $31^{st}$ tooth part, the $32^{nd}$ tooth part, the $33^{rd}$ tooth part, the $34^{th}$ tooth part, the $35^{th}$ tooth part, and the $36^{th}$ tooth part of the stator unit; the c-phase winding is formed by connecting the coils wound on the 7$^{th}$ tooth part, the 8$^{th}$ tooth part, the 9$^{th}$ tooth part, the 10$^{th}$ tooth part, the 11$^{th}$ tooth part, the 12$^{th}$ tooth part, the 25$^{th}$ tooth part, the 26$^{th}$ tooth part, the 27$^{th}$ tooth part, the 28$^{th}$ tooth part, the 29$^{th}$ tooth part, and the 30$^{th}$ tooth part of the stator unit.

11. A composite permanent magnet synchronous machine comprising:
- a permanent magnet synchronous machine module having a rotor unit with a plurality of rotor magnets and a stator unit with a plurality of slots surrounding the rotor unit, the stator includes 1$^{st}$ to 36$^{th}$ tooth parts,
- a bottom base having an accommodation space;
- a top cover having a front surface assembled with the bottom base so as to accommodate the permanent magnet synchronous machine module in between the bottom base and the top cover; and
- a shaft penetrating through the front surface and connected with the rotor unit, wherein the number of the rotor magnets for the rotor unit is P and the number of the slots for the stator unit is S; a tooth part is provided between every two adjacent slots and a coil is wound on the tooth part,
- a switching device connected with the coils wound on the tooth part for switching the permanent magnet synchronous machine module to a different phase by connecting the coils as one of three-phase connection, six-phase connection and nine-phase connection;
- wherein P and S are 38N and 36N, respectively, and N is a positive integer; or P and S are 34M and 36M, respectively, and M is a positive integer;
- wherein, when under the condition of N=1 and M=1, the six-phase connection allows the permanent magnet synchronous machine module to form a first winding including an a-phase winding, a b-phase winding, and a c-phase winding, and a second winding including an x-phase winding, a y-phase winding, and a z-phase winding;
- wherein the a-phase winding is formed by connecting the coils wound on the 1$^{st}$ tooth part, the 2$^{nd}$ tooth part, the 3$^{rd}$ tooth part, the 19$^{th}$ tooth part, the 20$^{th}$ tooth part, and the 21$^{st}$ tooth part of the stator unit; the b-phase winding is formed by connecting the coils wound on the 13$^{th}$ tooth part, the 14$^{th}$ tooth part, the 15$^{th}$ tooth part, the 31$^{st}$ tooth part, the 32$^{nd}$ tooth part, and the 33$^{rd}$ tooth part of the stator unit; the c-phase winding is formed by connecting the coils wound on the 7$^{th}$ tooth part, the 8$^{th}$ tooth part, the 9$^{th}$ tooth part, the 25$^{th}$ tooth part, the 26$^{th}$ tooth part, and the 27$^{th}$ tooth part of the stator unit; the x-phase winding is formed by connecting the coils wound on the 4$^{th}$ tooth part, the 5$^{th}$ tooth part, the 6$^{th}$ tooth part, the 22$^{nd}$ tooth part, the 23$^{rd}$ tooth part, and the 24$^{th}$ tooth part of the stator unit; the y-phase winding is formed by connecting the coils wound on the 16$^{th}$ tooth part, the 17$^{th}$ tooth part, the 18$^{th}$ tooth part, the 34$^{th}$ tooth part, the 35$^{th}$ tooth part, and the 36$^{th}$ tooth part of the stator unit; the z-phase winding is formed by connecting the coils wound on the 10$^{th}$ tooth part, the 11$^{th}$ tooth part, the 12$^{th}$ tooth part, the 28$^{th}$ tooth part, the 29$^{th}$ tooth part, and the 30$^{th}$ tooth part of the stator unit.

12. The composite permanent magnet synchronous machine as claimed in claim 11, wherein, in the six-phase connection, the phase difference between every two of the x-phase winding, the y-phase winding, and the z-phase winding of the second winding are 120°, and the phase difference between the a-phase winding of the first winding and the x-phase winding of the second winding is 30°.

* * * * *